United States Patent [19]

Nomura et al.

[11] Patent Number: 5,732,912
[45] Date of Patent: Mar. 31, 1998

[54] ROD LOCKING APPARATUS AND CAMERA STAND EMPLOYING THIS APPARATUS

[75] Inventors: Atsushi Nomura; Takashi Nakamura, both of Sakado, Japan

[73] Assignee: Nippon Control Industrial Co., Ltd., Saitama, Japan

[21] Appl. No.: 580,925

[22] Filed: Dec. 29, 1995

[30]    Foreign Application Priority Data

Jun. 19, 1995  [JP]  Japan .................. 7-175415

[51] Int. Cl.$^6$ ............................................. F16M 11/04
[52] U.S. Cl. ............................... 248/187.1; 248/287.1
[58] Field of Search ........................... 248/176.1, 220.21,
        248/295.11, 223.41, 125.1, 125.3, 124.1,
        125.8, 161, 177.1, 187.1, 676, 287.1, 510

[56]         References Cited

U.S. PATENT DOCUMENTS

| | | | |
|---|---|---|---|
| 836,959 | 11/1906 | Bushard | 248/161 |
| 1,797,893 | 3/1931 | Zerk | 248/187.1 |
| 2,012,628 | 8/1935 | Howell | 248/125.1 |
| 4,579,436 | 4/1986 | Jaumann | 248/187.1 |
| 4,684,089 | 8/1987 | Van Der Lely | 248/124.1 |
| 5,275,364 | 1/1994 | Burger | 248/125.1 |
| 5,615,854 | 4/1997 | Nomura et al. | 248/287.1 |

FOREIGN PATENT DOCUMENTS 905332  9/1962  United Kingdom ............... 248/125.2

Primary Examiner—Leslie A. Braun
Assistant Examiner—Gwendolyn W. Baxter
Attorney, Agent, or Firm—Wenderoth, Lind & Ponack

[57]          ABSTRACT

A rod locking apparatus with a simple structure and outstanding operability for facilitating rod locking and a camera stand with such a rod locking apparatus. The rod locking apparatus comprises an insertion hole formed in the main body, through which the rod is inserted, a space formed in the main body in such a manner that it intersects with the insertion hole, with a communicating hole that communicates with the insertion hole, an eccentrically rotating shaft inserted in the space with an external locking hand grip provided thereon and an elastic member provided on the external circumference of the eccentrically rotating shaft. This allows the rod to be easily locked and released. Also a camera stand comprising a slide track, a slider device mounted on the slide track in such a manner that it can freely slide a rod on which the slider device is mounted and a camera mounting platform mounted on the rod further provided with the rod locking apparatus described above wherein the position of the camera mounted on the camera mounting platform can be easily adjusted and locked into place.

20 Claims, 9 Drawing Sheets

ROD LOCKING APPARATUS AND CAMERA STAND EMPLOYING THIS APPARATUS

BACKGROUND OF THE INVENTION

1. Field of the Invention

The present invention relates to a rod locking apparatus which is used for locking a device to a rod or for locking a rod to a device and a camera stand employing this rod locking apparatus, which is used for mounting a camera (CCD camera) for image input of a desktop type video conferencing system.

2. Description of the Related Art

In recent years we have seen the advent of video conferencing systems based upon personal computers and work stations. CCD (charge coupled device) cameras are employed for image input in such systems, with the camera typically mounted over the display to capture the image of the sender's face for transmission to the receiver.

However, in video conferencing, it is often desirable to transmit images of documents and the like on the desk as well as the person. With the use of the cameras described earlier, transmission of such images is not possible without providing a separate camera for sending images of the documents and the like. This necessitates providing two cameras which makes the entire setup rather costly.

To deal with this problem, Japanese Patent Application No. H6-301492 dated Nov. 10, 1994 and U.S. patent application Ser. No. 08/407,667 dated Mar. 21, 1995, which is based upon the Japanese application, discloses a camera stand which it possible to maneuver a camera so that documents as well as persons can be pictured.

The camera stand disclosed in this application comprises a rail member mounted in a mounting portion, a sliding rod locking clamp which slides on the rail member, a sliding rod that is clamped by the sliding rod locking clamp, a vertical rod mounted at a right angle to the sliding rod and a camera mounting clamp with which a camera that is clamped onto the vertical rod is mounted.

As a result and according to this invention, the camera mounting clamp with which the camera is mounted can be moved in the vertical direction by moving the sliding rod locking clamp in the vertical direction along the rail member. The sliding rod is made to slide back and forth with the sliding rod locking clamp loosened. The camera mounting clamp for mounting the camera can be moved back and forth. By rotating the camera mounting clamp on the vertical rod, the direction of the camera can be changed through 360 degrees by turning it wherein the vertical rod is used as the fulcrum.

However, according to this invention the camera mounting clamp and the sliding rod mounting clamp are secured with screws which must be turned many times to operate the device. If the screws are not turned many times, the camera will not be held tightly and is likely to become offset due to vibration. On the other hand, if it is held too tightly, this presents another problem, in that release of the camera becomes difficult. Thus, further improvement in operability in sliding, rotating and locking is desirable.

SUMMARY OF THE INVENTION

Reflecting the above, the object of the present invention is to provide a rod locking apparatus in superior operability and a simple structure with which a rod can be easily secured and also a camera stand provided with this rod locking apparatus.

Accordingly, the rod locking apparatus of the present invention includes a main body through which a rod passes in such a manner that it can slide freely or be locked, an insertion hole formed in the main body through which the rod is inserted, a space that is provided with a communicating opening that opens into the insertion hole, and which is formed in the main body in such a manner that it intersects the insertion hole. The locking apparatus further includes an eccentrically rotating shaft inserted in the space with an external locking hand grip provided thereon and an elastic member on the external circumference of the rotating shaft so that when the locking hand grip is turned, the force applied to the rod by the elastic member provided on the external circumference of the shaft is increased thereby locking the rod to the main body.

According to the present invention locking of the rod is facilitated, since the external circumferential surface of the rod inserted in the insertion hole is exposed in the space with the communicating opening and the rod is locked by pressing down on the exposed external circumferential surface of the rod with the elastic member mounted on the eccentrically rotating shaft.

Also, since the range of rotation of the locking hand grip is small, at approximately 90 degrees from the position where the decentered shaft is closest to the rod, i.e. the position where maximum force is applied to the rod, to the position where the contact of the elastic member imparts a specific frictional resistance, the locking operation required is simple. In addition positioning is facilitated, even in the state in which a contact is at the minimum, since the specific frictional resistance is retained and the rod will be held still until a force is applied from the outside.

Furthermore, another embodiment of the present invention is a camera stand comprising a slide track provided with rail portions, a slider device that travels on the slide track, a rod that is inserted in the main body of the slider device in such a manner that it can freely slide, a rod locking apparatus that is provided with an insertion hole formed in the main body of the slider device through which the rod is inserted, a space provided with a communicating opening that communicates with the insertion hole and which intersects the insertion hole via the communicating opening, an eccentrically rotating shaft inserted in the space with an external locking hand grip provided thereon and an elastic member provided on the external circumference of the rotating shaft so that when the locking hand grip is turned, the force applied to the rod by the elastic member provided on the circumference of the locking shaft is increased, locking the rod to the main body of the slider device, and a camera mounting platform that is mounted on the rod.

According to the present invention, since the rod locking apparatus described earlier is employed as the rod locking apparatus in the camera stand and the rod onto which the camera mounting platform is secured can be easily moved and locked. This, in turn, makes it possible to freely adjust and fix the position of the camera.

Furthermore, the slider device, which is provided with a rail holding portion formed in the main body for holding the rail portions of the slide track and a means for slider connection for maintaining the position of the slider device, can be moved up and down freely and secured.

Moreover, in the camera stand according to the present invention, the rod locking apparatus is mounted onto the camera mounting platform. The rod locking apparatus comprises an insertion hole, through which the rod is inserted, formed in the main body, a space provided with a communicating opening that opens into the insertion hole where it intersects the insertion hole, an eccentrically rotating shaft inserted in the space with an external locking hand grip provided thereon and an elastic member provided on the external circumference of the rotating shaft. Therefore, by turning the locking hand grip, the force with which the elastic member provided on the external circumference of the shaft is pressed against the rod is increased, locking the camera mounting platform to the rod.

As such, in the camera stand according to the present invention it is easy to adjust the camera position, by adjusting the sliding position of the slider device relative to the slide track adjusting, the sliding position and the rotational position of the rod relative to the slider device, and adjusting the sliding position and rotational position of the camera mounting platform 40 relative to the rod 30.

BRIEF DESCRIPTION OF THE DRAWINGS

These and other advantages, features and objects of the present invention will be understood by those of ordinary skill in the art referring to the annexed drawings, given purely by way of non-limitative example, in which:

FIG. 7A is a plan view of the sleeve that is to be mounted on the decentered potion of the rotating shaft while

DETAILED DESCRIPTION OF THE PREFERRED EMBODIMENT

Figure 1:
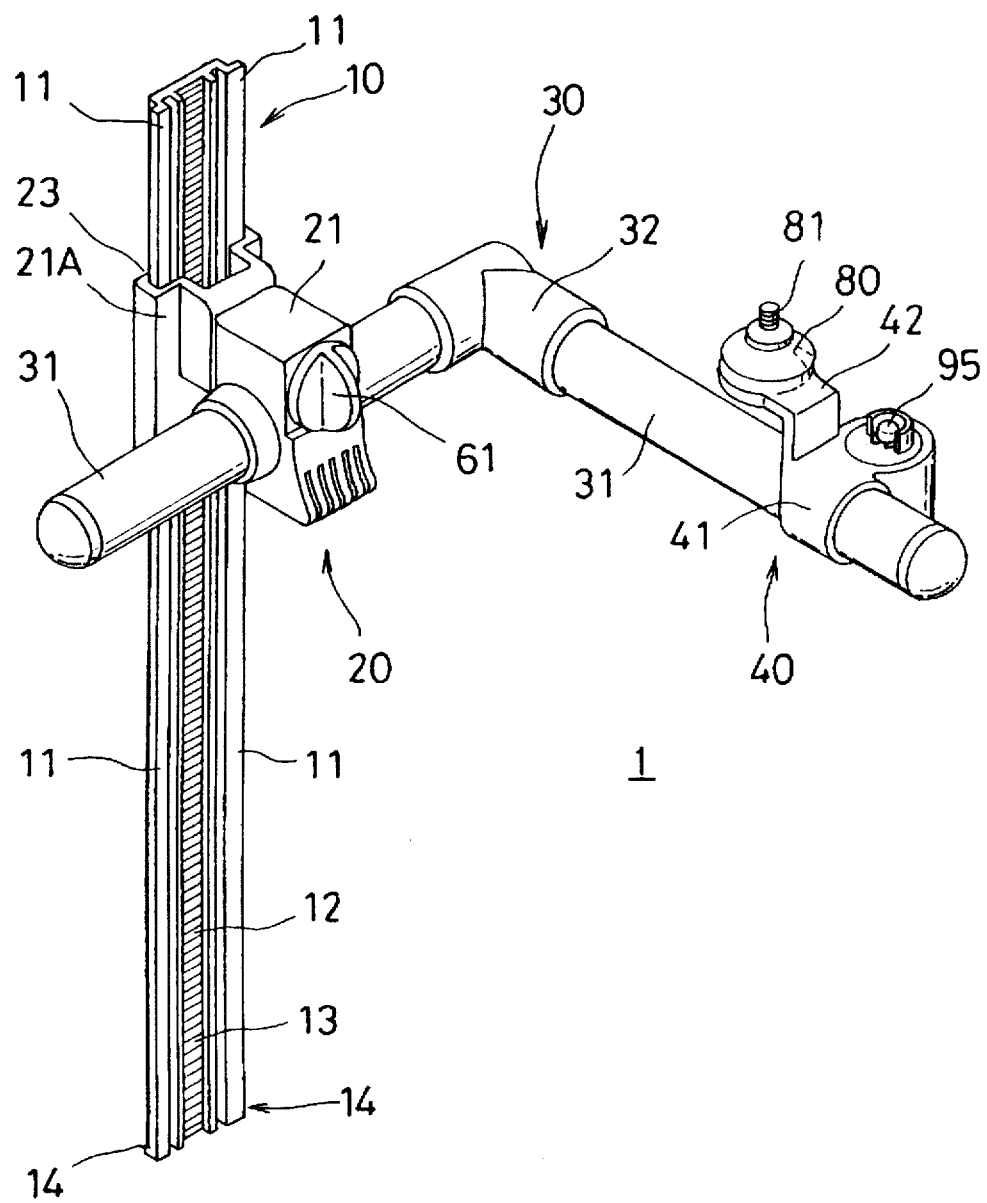
FIG. 1 is a perspective of the camera stand according to the present invention.
Figure 2:
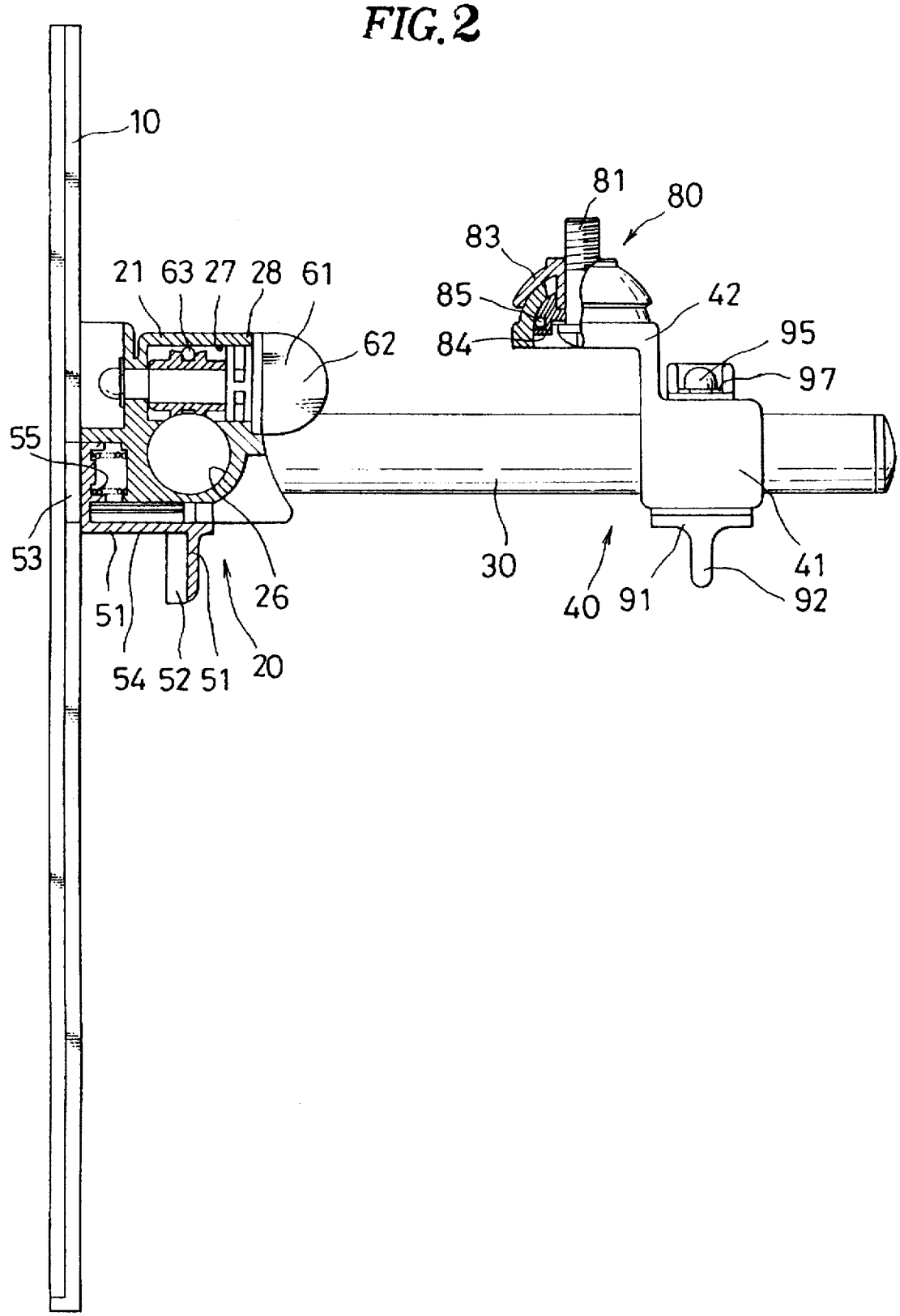
FIG. 2 is a side view of the camera stand according to the present invention, which includes a partial cross section.
Figure 3:
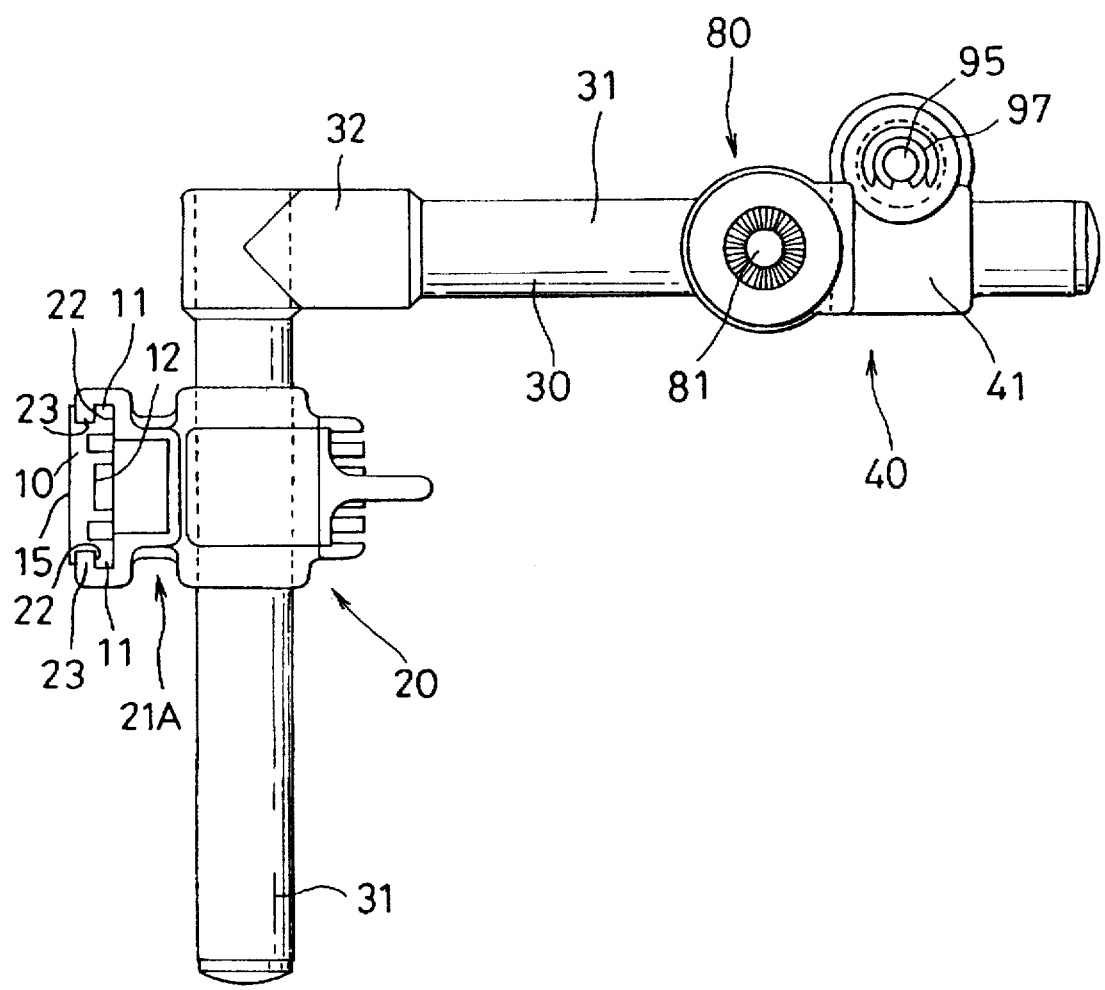
FIG. 3 is a plan view of the camera stand according to the present invention.

The following is an explanation of the preferred embodiment according to the present invention in reference to the drawings. In FIGS. 1-3, a camera stand 1 comprises a slide track 10 that is mounted on the case of a display device (not shown), a slider device 20 that is mounted on the slide track 10 in such a manner that it can slide freely, a rod 30 that is formed in an L-shape with one end held in the slider device 20 and a camera mounting platform 40 that is mounted at the other end of the rod 30.

The slide track 10 is an elongated plate member and is provided with rail portions 11 and 11 that extend out at the two sides. Also at its center is a connecting groove 12 formed along the direction of the length with teeth 13 formed over specific intervals (a pitch of 0.5 mm in this embodiment) in this connecting groove 12. At the lower ends of the rail portions 11 and 11 are groove stops 14 and 14 formed to prevent the slider device 20, to be mounted on the slide track 10, from falling out at the lower end.

Moreover, an adhering layer such as double sided tape for adhering the slide track 10 to a support member, i.e. the member to which the camera stand is to be mounted such as a monitor, is provided on the rear surface 15 of the slide track 10. When the backing paper is peeled off and the adhering layer is pressed onto the mounting surface, the slide track 10 is secured onto the member which it is to be mounted. Furthermore, if the member to which the track is to be mounted is constituted of a magnetic material, the adhering layer may be constituted of a magnetic sheet. In any case, the method for adhesion is not limited to a specific method.

As shown in FIGS. 1-5, the slider device 20 comprises a main body 21 provided with a rail holding portion 21A, a slide connecting device 50 and a rod locking apparatus 60.

The rail holding portion 21A comprises grooved portions 22 and 22, in which the rail portions 11 and 11 are inserted, and tab portions 23 and 23 for holding the rail portions 11 and 11 in the grooved portions 22 and 22.

The slide connecting device 50 comprises a slide portion 51 that is mounted at the lower portion of the main body 21 and a spring 55. The slide portion 51 comprises an operating portion 54 that is provided with a finger pad 52 protruding out in the lower portion and a toothed portion 53, which comes in contact with the toothed groove 12 in the slide track. In the rear surface of the toothed portion 53 are teeth 56 with a pitch identical to that of the teeth 13 formed in the toothed groove 12, formed so that the teeth 56 fit into the teeth 13 when the slide portion 51 is pressed toward the toothed groove 12 by the spring 55.

In the structure described above, when the slider device 20 is moved relative to the slide track 10, the slide portion 51 is operated so as to separate from the slide track 10, i.e., to disengage the teeth 56 of the toothed portion 53 from the teeth 13 in the toothed groove 12, wherein the slider device 20 is then free to travel up and down. By operating the slide portion 51 toward the slide track 10 at a specific position, i.e. letting go of the slide portion 51 to cause the slide portion 51 to return under the force of the spring 55, the slider device 20 is secured to the slide track 10.

The rod locking apparatus 60 comprises an insertion hole 26 formed in the main body 21 of the slider device 20 through which the rod 30 is inserted. A space 27 is formed above the insertion hole 26, which communicates with the insertion hole 26 via a communicating opening 26a and intersects the insertion hole 26. An eccentrically rotating shaft 61 is inserted in the space 27, with an external locking hand grip 62 provided thereon and an elastic member 72 provided on the external circumference of the rotating shaft.

To be more specific, a portion of the external circumference of the rod 30, which is inserted through the insertion hole 26, is made to be exposed to the space 27, in which the rotating shaft 61 is mounted, at the communicating opening 26a formed where the space 27 intersects the insertion hole 26. The rotating shaft 61 is, as shown in FIGS. 6A, 6B, 6C and 6D, provided with a locking hand grip 62, which in turn is provided with a tab portion formed by a semicircle projection and a first holding portion 63 with a side surface that comes in contact with the internal circumferential surface of the space 27. A decentered shaft 64 formed by extending off center from the first holding portion 63 and a second holding portion 65 that extends out from the decentered shaft 64 and is also concentric to the first holding portion 63. On the external circumference of the first holding portion 63 is a guide projection 66, which is fitted in the guide groove 28, and on the second holding portion 65 is an E-ring fitting groove 67 when the rotating shaft 61 is mounted in the space 27, the second holding portion 65 projects out of a holding hole 27a (shown in FIG. 4 and FIG. 5), which is formed on the inner wall of space with the E-ring 73 (shown in FIG. 4 and FIG. 5) fitted in the E-ring fitting groove 67. The rotating shaft 61 is secured in the space 27 in such a manner that it can rotate freely.

Figure 7A:
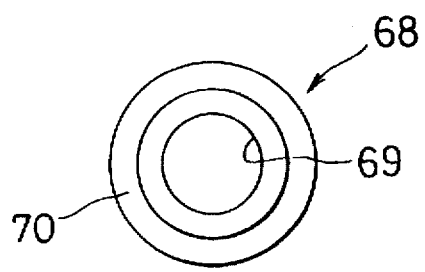
Figure 7B:
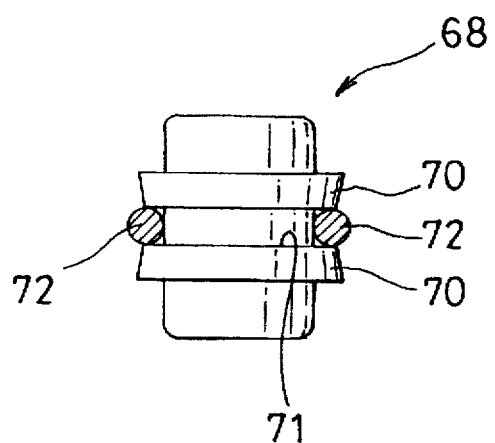
FIG. 7B is its side view.
Figure 8:
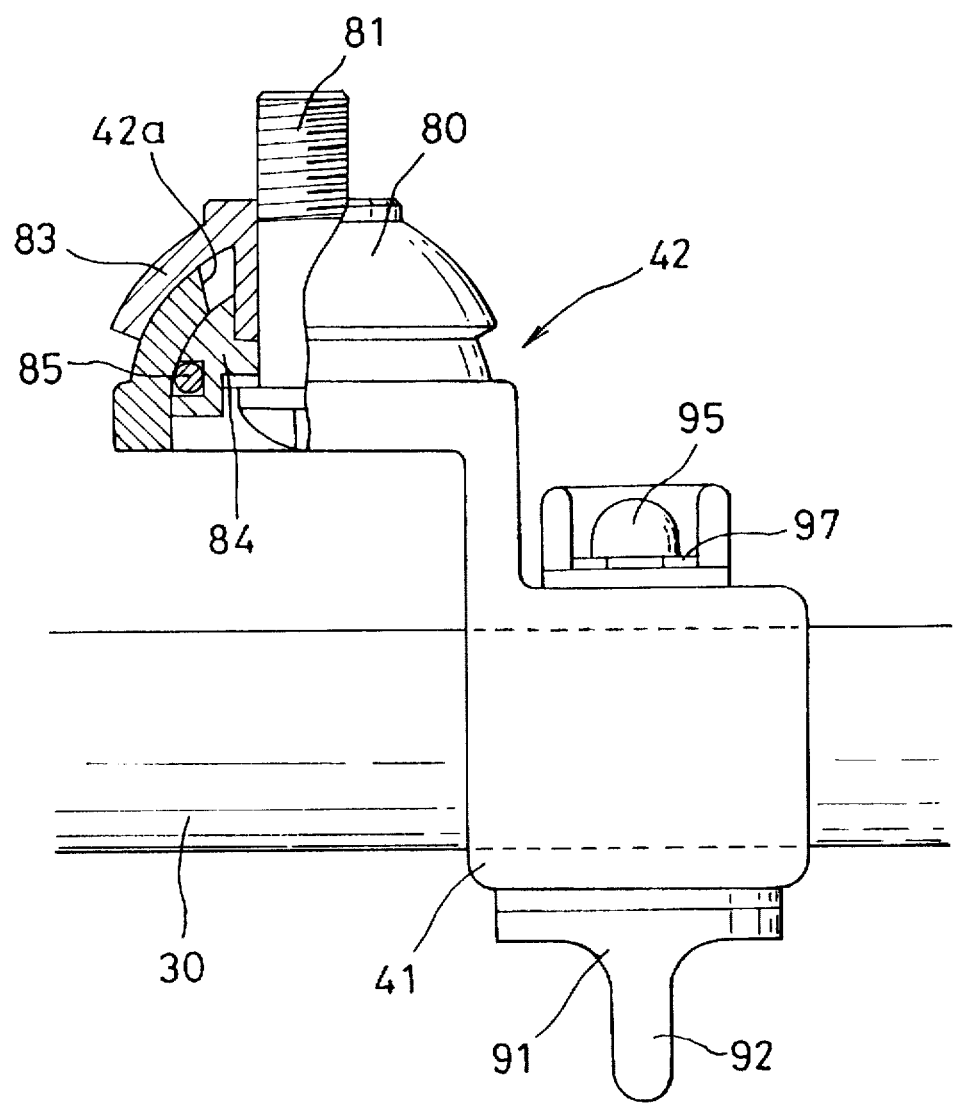
FIG. 8 is a partial cross section of the camera mounting platform.

A sleeve 68 which is shown on FIGS. 7A and 7B is inserted in the decentered shaft 64 of the rotating shaft 61. Inside the sleeve 68 is a mounting hole 69 in which the decentered shaft 64 is mounted. The sleeve 68 includes external circumferential surface, including a pair of elastic member mounting walls 70 which are circularly formed. Between the pair of elastic member mounting walls 70 is an elastic member mounting groove 71 and an O-ring, elastic member 72. In addition, the circumferential edges of the elastic member mounting groove 71 conform to the surface of the rod 30.

Figure 4:
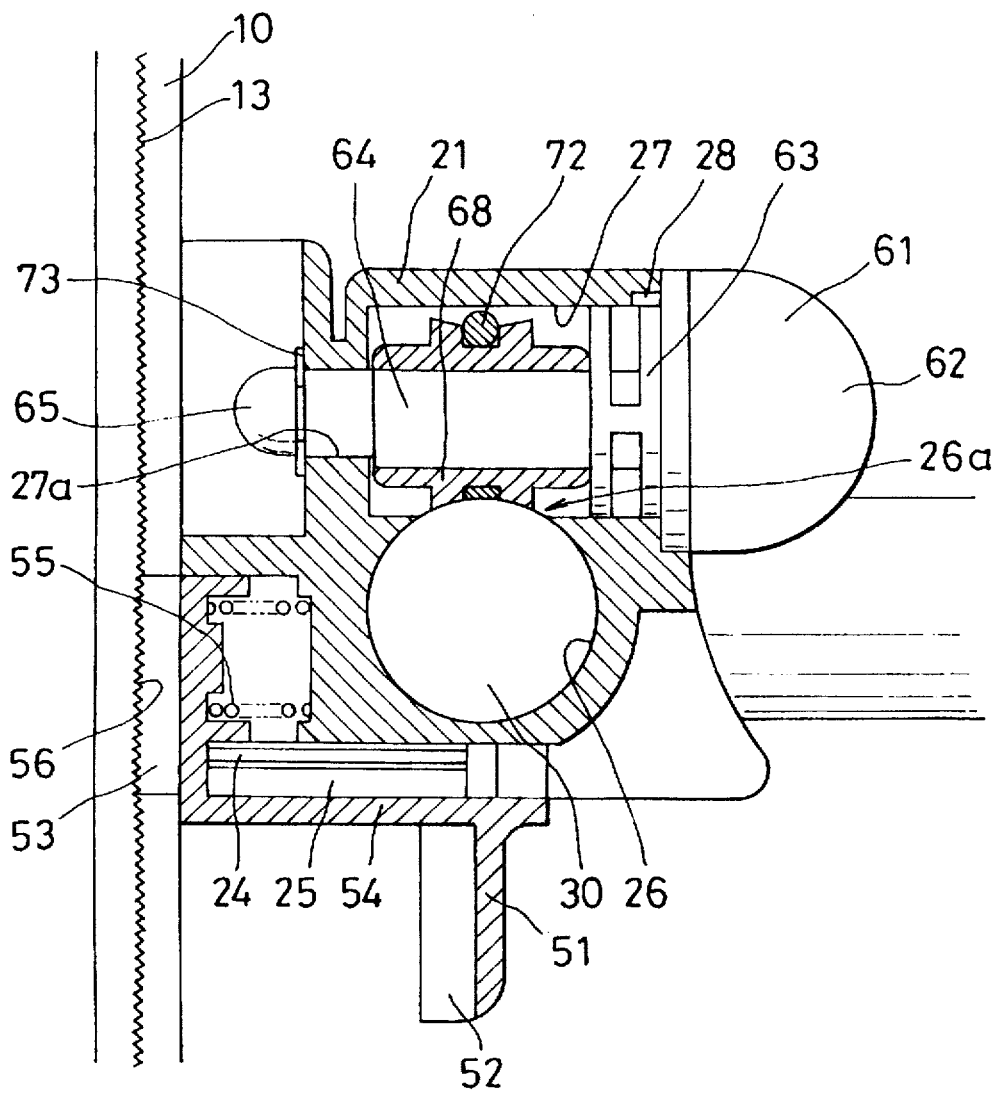
FIG. 4 is a cross section of the slider device with the means for rod connection locking the L-shaped rod.

FIG. 4 shows the rod locking apparatus 60 structured as described above, with the rod locking apparatus locking the rod 30. This is a state in which the locking hand grip 62 has been turned and the decentered shaft 64 is at its closest point with respect to the rod 30. The O-ring 72 which is fitted in the elastic member mounting groove 71 of the sleeve 68 which in turn is mounted at the decentered shaft 64 presses the rod 30 with a maximum force so that the rotational position and the sliding position of the rod 30 relative to the slider device 20 are fixed.

Figure 5:
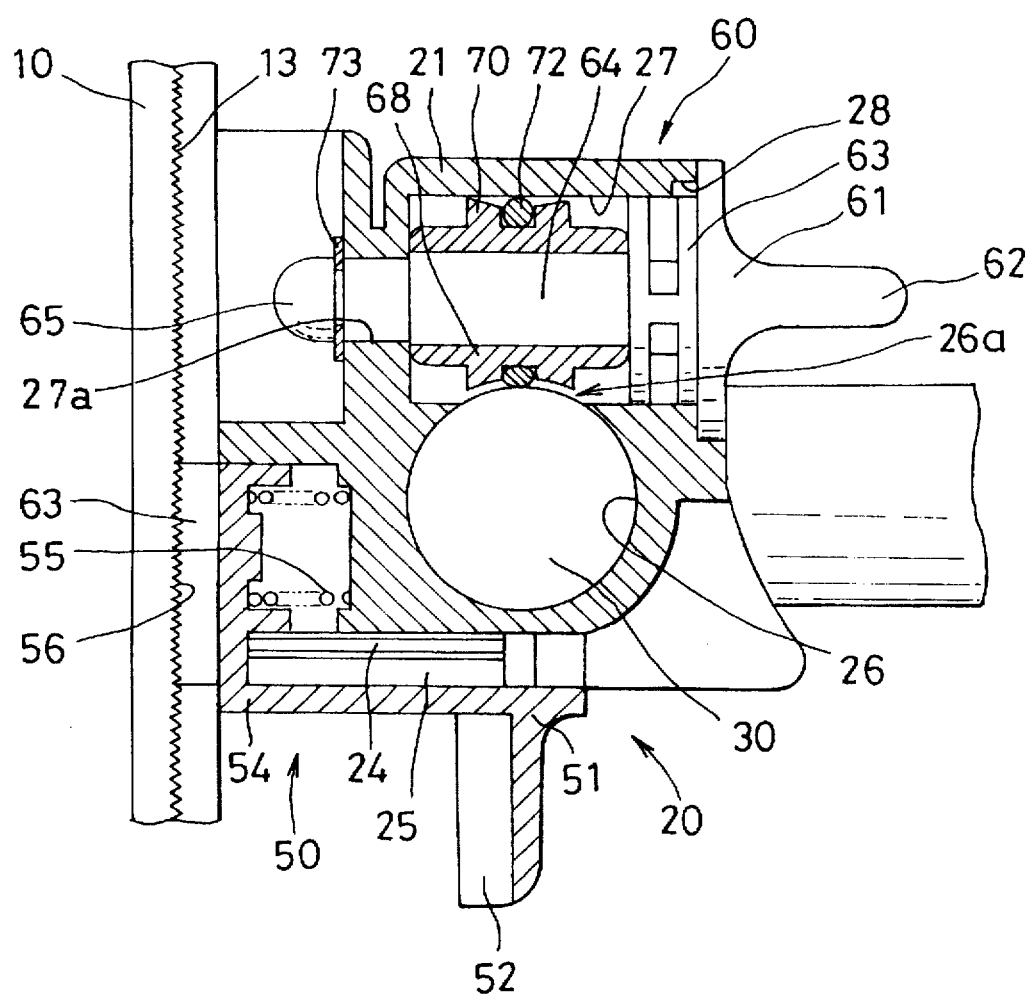
FIG. 5 is a cross section of the slider device with the means for rod connection lightly in contact with the L-shaped rod.
Figure 6A:
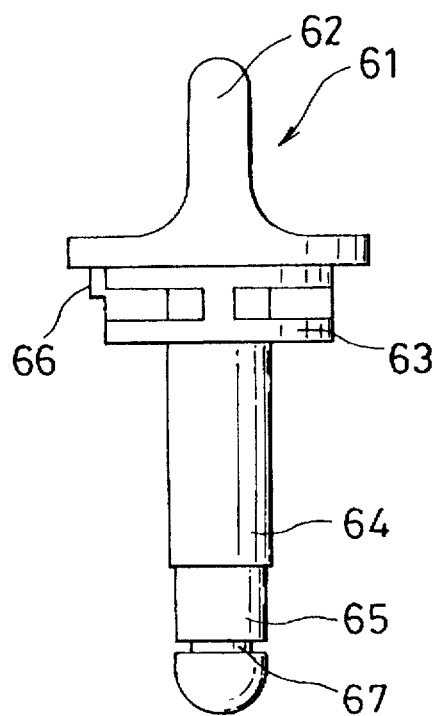
FIG. 6A is a front view of the rotating shaft.
Figure 6B:
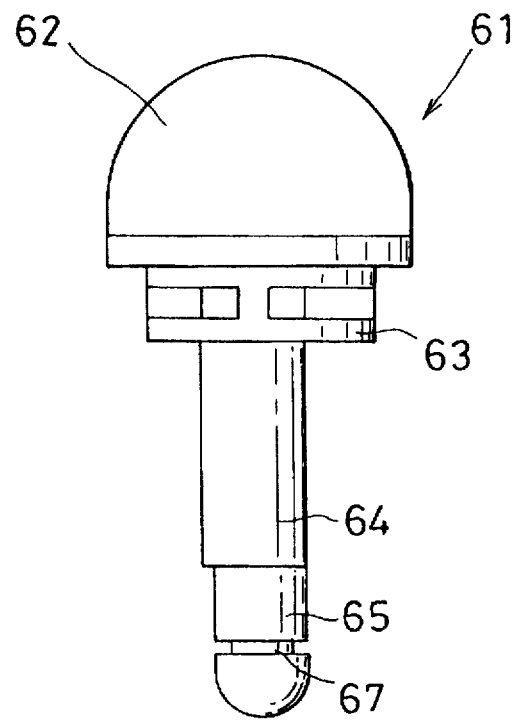
FIG. 6B is its side view.
Figure 6C:
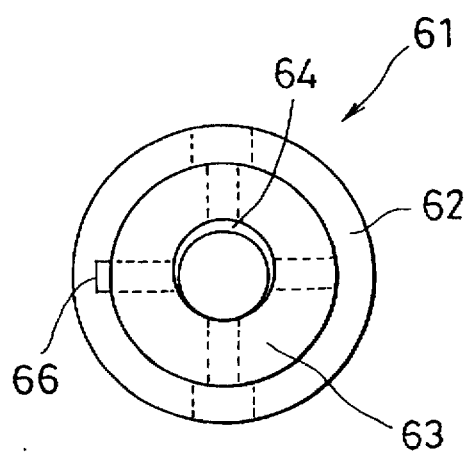
FIG. 6C is a bottom view of FIG. 6A
Figure 6D:
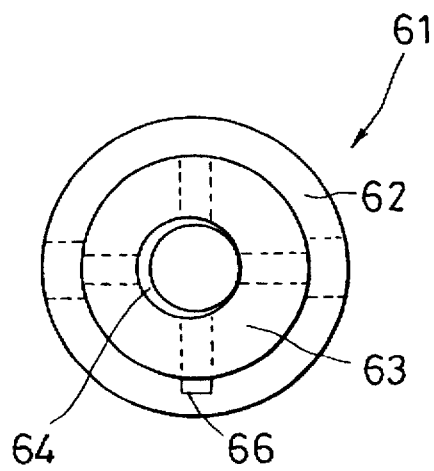
FIG. 6D is a bottom view of FIG. 6B.

In addition, FIG. 5 shows a state of moderate contact in which the rod locking apparatus 60 imposes a specific frictional resistance against the rod 30. This is a state in which the locking hand grip 62 has been turned approximately 90 degrees from the state shown in FIG. 4 with the O-ring 72 in contact with the rod 30 at a specific frictional resistance. The level of this fictional resistance is such that the rod is held without either rotating or sliding unless an external force is applied. Once a force is applied by hand to the rod 30, the rod rotates or slides easily. This ensures that the guide groove 28 is formed within the range that allows the guide projection 66 to move from the rod locking position to a position where it has a specific frictional resistance and also ensures that it does not go beyond that point. In this embodiment, the guide groove 28 is formed within a range that allows the guide projection 66 to turn 90 degrees.

The rod 30 is made to remain in the state of moderate contact even in the most released state wherein the rod 30 is held with a specific level of frictional resistance to ensure that the rod 30 is prevented from rotating abruptly because of the weight of the camera mounted at the other end of the rod 30. It also helps when making fine adjustments of the sliding position and the rotational position of the rod 30. In other words, it is made to move when a force is applied by hand and as soon as the hand is removed then the movement is made to come to stop.

After moving the rod 30 to a desired position as shown in FIG. 4, i.e. its state in which the decentered shaft 64 is decentered to the lowest position which is achieved by turning the locking hand grip 62 approximately 90 degrees so that the O-ring 72 is pressed against the rod 30 to lock the rod 30 the position of the rod 30 can be adjusted to a fine tolerance quickly and locked.

The rod 30 is constituted by mounting a pipe 31, constituted of aluminum or an aluminum alloy, onto a joint 32 to form an L-shape. The rod 30 is constituted with a hollow pipe to achieve a reduction in weight. Note: in this embodiment the rod 30 is formed by combining the pipe and the joint but, it may be formed as an integrated L-shaped unit of a material such as synthetic resin.

The camera mounting platform 40 is shown in FIGS. 1–3, 8 and 9 and comprises a locking portion 41 and the camera mounting portion 42.

A rod locking apparatus 90 (second rod locking apparatus) which is structured identically to that described earlier, is mounted at the locking portion 41. The second rod locking apparatus 90 comprises an insertion hole 86 formed in the locking portion 41, into which the rod 30 is inserted, a space 87 formed at a side of the insertion hole 86 communicates with the insertion hole 86 via a communicating opening 86a and intersects the insertion hole 86, an eccentrically rotating shaft 91 inserted in the space 87, with an external locking hand grip 92 provided thereon and an elastic member 102 provided on the external circumference of the rotating shaft 91.

To be more specific, a portion of the external circumference of the rod 30, which is inserted through the insertion hole 86 is made to be exposed to the space 87 at the communicating opening 86a, and the rotating shaft 91 is mounted in the space 87 which intersects the insertion hole 86. The rotating shaft 91 is provided with the locking hand grip 92, which includes a tab portion formed by a semicircle projection. A first holding portion 93 with a side surface that comes in contact with the internal circumferential surface of the space 87. A decentered shaft 94 formed by extending off center from the first holding portion 93 and a second holding portion 95 that extends out from the decentered shaft 94 which is also concentric to the first holding portion 93. On the external circumference of the first holding portion 93 is a guide projection 96, which is fitted in the guide groove 88. In the second holding portion 95 is an E-ring fitting groove 97. When the rotating shaft 91 is mounted in the space 87, the second holding portion 95 projects out of a holding hole 87a, which is formed on the inner wall of the space 87 and with an E-ring 103 fitted in the E-ring fitting groove 97, and the rotating shaft 91 is secured in the space 87 in such a manner that it can freely rotate.

A sleeve 98 is fitted onto the decentered shaft 94 of the rotating shaft 91. Inside the sleeve 98 is a mounting hole 99 in which the decentered shaft 94 is mounted and on its external circumferential surface is a pair of circular elastic member mounting walls 100. Between the pair of elastic member mounting walls 100 is an elastic member mounting groove 101 and an O-ring which constitutes the elastic member 102. In addition, the circumferential edges of the elastic member mounting groove 101 conform to the surface of the rod 30.

Figure 9:
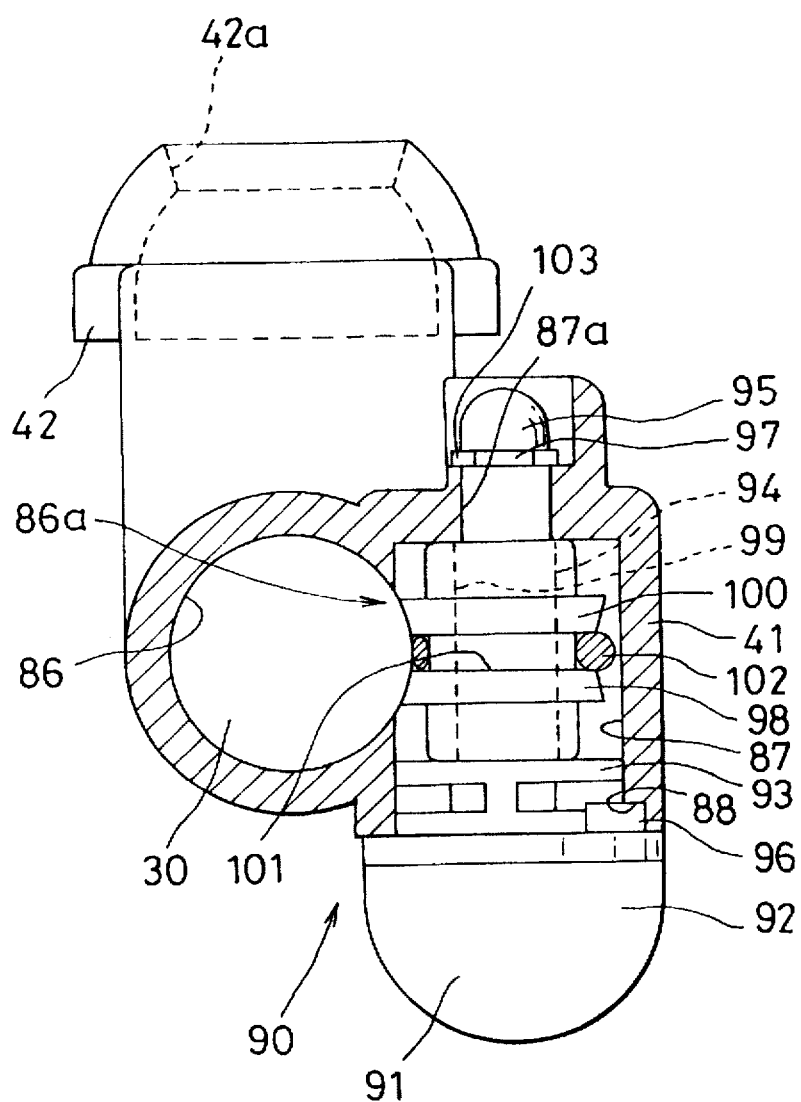
FIG. 9 is a partial cross section of the means for rod locking of the camera mounting platform.

The state in which the second rod locking apparatus 90 locks the rod 30 is a state in which the decentered shaft 94 is at its closest point relative to the rod 30, as shown in FIG. 9. Also in this state the O-ring 102, which is fitted in the elastic member mounting groove 101 of the sleeve 98 presses the rod 30 with a maximum force such that the rotational position and the sliding position of the camera mounting platform 40 relative to the rod 30 is fixed.

In addition, the state of moderate contact in which the second rod locking apparatus 90 imposes a specific frictional resistance against the rod 30, is a state in which the locking hand grip 62 has been turned approximately 90 degrees from the state described above. As such, the O-ring 102 is in contact with a rod 30 at the specific frictional resistance. This level of frictional resistance is such that the camera mounting platform 40 is held without either rotating or sliding relative to the rod 30 unless an external force is applied. Once a force is applied by hand to the camera mounting platform 40, it causes the platform to rotate or slide easily. This ensures that a guide groove 88 is formed within the range that allows the guide projection 96 to move from the locking position, where the camera mounting platform 40 is locked, to a position where the platform imposes a specific frictional resistance that does not go beyond that resistance. In this embodiment, the guide groove 88 is formed within a range that allows the guide projection 96 to turn 90 degrees.

As such, a state is achieved in which the camera mounting platform 40 moves easily when a force is applied by hand and stops immediately when released.

After moving and rotating the camera mounting platform 40 to a desired position, the decentered shaft 94 is moved to a position closest to the rod 30 by turning the locking hand grip 92 approximately 90 degrees which presses the O-ring 102 against the rod 30. With the second rod locking apparatus 90 set in this manner, the position of camera mounting platform 40 can be adjusted quickly to a fine tolerance and then locked.

A swivel joint 80 is provided at the camera mounting portion 42 of the camera mounting platform 40. The swivel joint 80 is provided with a screw 81 that projects out of the center of the swivel joint 80, onto which a threaded hole formed on a lower surface of a camera main body (not shown) is fitted to secure the camera. In addition, the camera mounting portion 42 is located sufficiently far from the locking portion 41 in an opposite direction that the rod 30 does not get in the way when the camera is rotated.

Note that the swivel joint 80 is constituted with the camera mounting portion 42 mentioned earlier, an external member 83 that slides against the outer surface of the camera mounting portion 42, an internal member 84 that slides against the inner surface of the camera mounting portion 42, the screw 81 mentioned earlier and an O-ring 85. The external member 83 and the internal member 84 are linked via the screw 81 to clamp the camera mounting portion 42 in such a manner that it can freely slide. Thus, the swivel joint 80 can turn freely within the range of the hole portion 42a formed in the camera mounting portion 42.

In this embodiment the camera mounting platform 40 is mounted so that the camera mounting portion 42 extends out to the left, as in FIG. 2. The camera mounting platform 40 may be mounted in such a manner that it extends out to the right by changing the direction in which the camera mounting platform 40 is mounted to the rod 30.

Since the means for rod connection 60 mentioned earlier is mounted at the camera mounting platform 40 the position of the camera mounting platform 40 relative to the rod 30 can also be adjusted to a fine tolerance.

Consequently, since this camera stand, the sliding position of the slider device 20 relative to the slide track 10, the sliding position and the rotational position of the rod 30 relative to the slider device 20, and the sliding position and the rotational position of the camera mounting platform 40 relative to the rod 30 can be adjusted in combination with the rotational adjustment of the camera mounting platform 40 at the swivel joint 80, the camera position can be adjusted at will.

What is claimed is:

1. A rod locking apparatus comprising:
   a main body;
   an insertion hole formed through said main body;
   a rod slidably mounted in said insertion hole;
   a handgrip having an axis crossing said insertion hole and an eccentrically mounted rotating shaft thereon eccentric relative to the axis, said rotating shaft extending in said space of said main body, and said handgrip and rotating shaft being rotatable about the axis; and
   an elastic member provided on said rotating shaft;
   wherein said handgrip is rotatable between a first position where said rotating shaft is at a minimum distance from said rod, and said elastic member engages and holds said rod, and a second position where said rotating shaft is at a maximum distance from said rod, said first distance from said insertion hole being shorter than said second distance from said insertion hole.

2. A rod locking apparatus, as claimed in claim 1, wherein said rotating shaft comprises an eccentric shaft portion extending from said handgrip and a sleeve externally fitted on said eccentric shaft portion.

3. A rod locking apparatus, as claimed in claim 2, and further comprising a pair of elastic member mounting walls formed along an external circumference of said sleeve and forming an elastic member mounting groove therebetween, wherein said elastic member is mounted in said elastic member mounting groove.

4. A rod locking apparatus, as claimed in claim 3, wherein said elastic member mounting walls include external circumferential edges that are adapted to conform to a surface of said rod.

5. A rod locking apparatus, as claimed in claim 1, wherein said elastic member is an O-ring.

6. A rod locking apparatus, as claimed in claim 1, wherein said locking hand grip rotates approximately 90° about from said first position to said second position.

7. The rod locking apparatus, as claimed in claim 1, wherein said second position of said locking handgrip allows said rod to be moved by a force greater than a specific frictional resistance between said elastic member and said rod.

8. The rod locking apparatus, as claimed in claim 1, wherein said elastic member is in contact with said rod in both said first and second positions of said locking handgrip.

9. A camera stand comprising:
   a slide track;
   a slider device slidable along said slide track;
   a rod locking apparatus coupled to said slider device;
   a rod slidably mounted in said rod locking apparatus; and
   a camera mounting platform mounted on said rod;
   wherein said rod locking apparatus comprises:
      a main body,
      an insertion hole formed through said main body slidably receiving said rod therein,
      said rod slidably mounted in said insertion hole,
      a space formed in said main body, wherein said space crosses said insertion hole, and has a communicating opening between said space and said insertion hole,
      a handgrip having an axis crossing said insertion hole and an eccentrically mounted rotatable shaft thereon eccentric relative to the axis, said rotatable shaft extending in said space of said main body, said handgrip and rotatable shaft being rotatable about the axis,
      an elastic member provided on said rotatable shaft,
      wherein said handgrip is rotatable between a first position where said rotating shaft is at a minimum distance from said rod and said elastic member engages and holds said rod in a fixed position, and a second position where said rotating shaft is at a maximum distance from said rod and where said elastic member allows said rod to be moved in said insertion hole.

10. A camera stand, as claimed in claim 9, wherein said slide track comprises rails and said slider device further includes a rail holding portion to slide said slider device with respect to said slide track, and a slide stopping means for maintaining a desired position of said slider device with respect to said slide track.

11. A camera stand, as claimed in claim 10, wherein said slider stopping means comprises a slide button and a spring, said slide button having an operating portion and a toothed portion fitting into a retaining groove of said slide track, said spring biasing said toothed portion into said retaining groove to lock said slider device to said slide track.

12. A camera stand, as claimed in claim 11, wherein said retaining groove of said slide track includes notches having a specific pitch and said toothed portion of said slider stopping means includes notches having a specific pitch, wherein said pitch of said retaining groove is equal to said pitch of said toothed portion.

13. A camera stand comprising:
a slide track;
a slider device slidable along said slide track;
a first rod locking apparatus coupled to said slider device;
a rod slidably mounted in said first rod locking apparatus; and
a camera mounting platform mounted on said rod, said camera mounting platform including a lock portion and a camera mounting portion;
wherein said first locking apparatus comprises:
a main body,
an insertion hole formed through said main body slidably receiving said rod therein,
said rod slidably mounted in said insertion hole,
a space formed in said main body wherein said space crosses said insertion hole and has a communicating opening between said space and said insertion hole,
a handgrip having an axis crossing said insertion hole and an eccentrically mounted rotating shaft thereon eccentric relative to the axis, said rotating shaft extending in said space of said main body, said handgrip and said rotating shaft being rotatable about the axis,
an elastic member on said rotating shaft,
wherein said handgrip is rotatable between a first position where said rotating shaft is at a first distance from said rod and said elastic member engages and holds said rod in a fixed position, and a second position where said rotating shaft is at a second distance from said rod and where said elastic member allows said rod to be moved in said insertion hole, said first distance from said rod being shorter than said second distance from said rod;
wherein said locking portion of said camera mounting platform includes a second rod locking apparatus, said second locking apparatus comprising:
a main body,
an insertion hole formed through said main body slidably receiving said rod therein,
a space formed in said main body, wherein said space crosses said insertion hole and has a communicating opening between said space and said insertion hole,
a handgrip having an axis crossing said insertion hole and an eccentrically mounted rotatable shaft thereon eccentric relative to the axis, said rotatable shaft extending in said space of said main body, said handgrip and said rotatable shaft being rotatable about the axis,
an elastic member on said rotatable shaft,
wherein said handgrip is rotatable between a first position where said rotating shaft is at a first distance from said rod and said elastic member engages and holds said rod in a fixed position, and a second position where said rotating shaft is at a second distance from said rod and where said elastic member allows said rod to be moved in said insertion hole, said first distance from said rod being shorter than said second distance from said rod.

14. A rod locking apparatus, as claimed in claim 13, wherein each of said rotating shafts of said first and second rod locking apparatuses comprises an eccentric shaft portion extending from said handgrip and a sleeve externally fitted on said eccentric shaft portion.

15. A camera stand, as claimed in claim 14, wherein each of said first and second locking apparatuses includes a pair of elastic member mounting walls formed along an external circumference of said sleeve and forming an elastic member mounting groove therebetween, said elastic members being mounted in said elastic member mounting grooves.

16. The camera stand, as claimed in claim 15, wherein said elastic member mounting walls in each of said first and second rod locking apparatuses include external circumferential edges that are adapted to conform to a surface of said rod.

17. The camera stand, as claimed in claim 13, wherein said elastic member in each of said first and second locking apparatuses is an O-ring.

18. The camera stand, as claimed in claim 13, wherein said rod locking handgrip is each of said first and second rod locking apparatuses rotates approximately 90° from said first position to said second position.

19. The camera stand, as claimed in claim 13, wherein each of said second positions of said locking handgrips allows said rod to be moved by a force greater than a specific frictional resistance between each of said elastic members and said rod.

20. The camera stand, as claimed in claim 13, wherein each of said elastic members is in contact with said rod in both said first and second positions of said locking handgrips.

* * * * *

UNITED STATES PATENT AND TRADEMARK OFFICE
CERTIFICATE OF CORRECTION

PATENT NO. : 5,732,912
DATED : March 31, 1998
INVENTOR(S) : Atsushi NOMURA et al.

It is certified that error appears in the above-indentified patent and that said Letters Patent is hereby corrected as shown below:

Column 10, Claim 14, first line, change "A rod locking apparatus" to --A camera stand--.

Signed and Sealed this

First Day of December, 1998

Attest:

BRUCE LEHMAN

*Attesting Officer*        *Commissioner of Patents and Trademarks*